May 8, 1934. B. T. DEXTER 1,957,944
LANDING NET
Filed Oct. 12, 1932
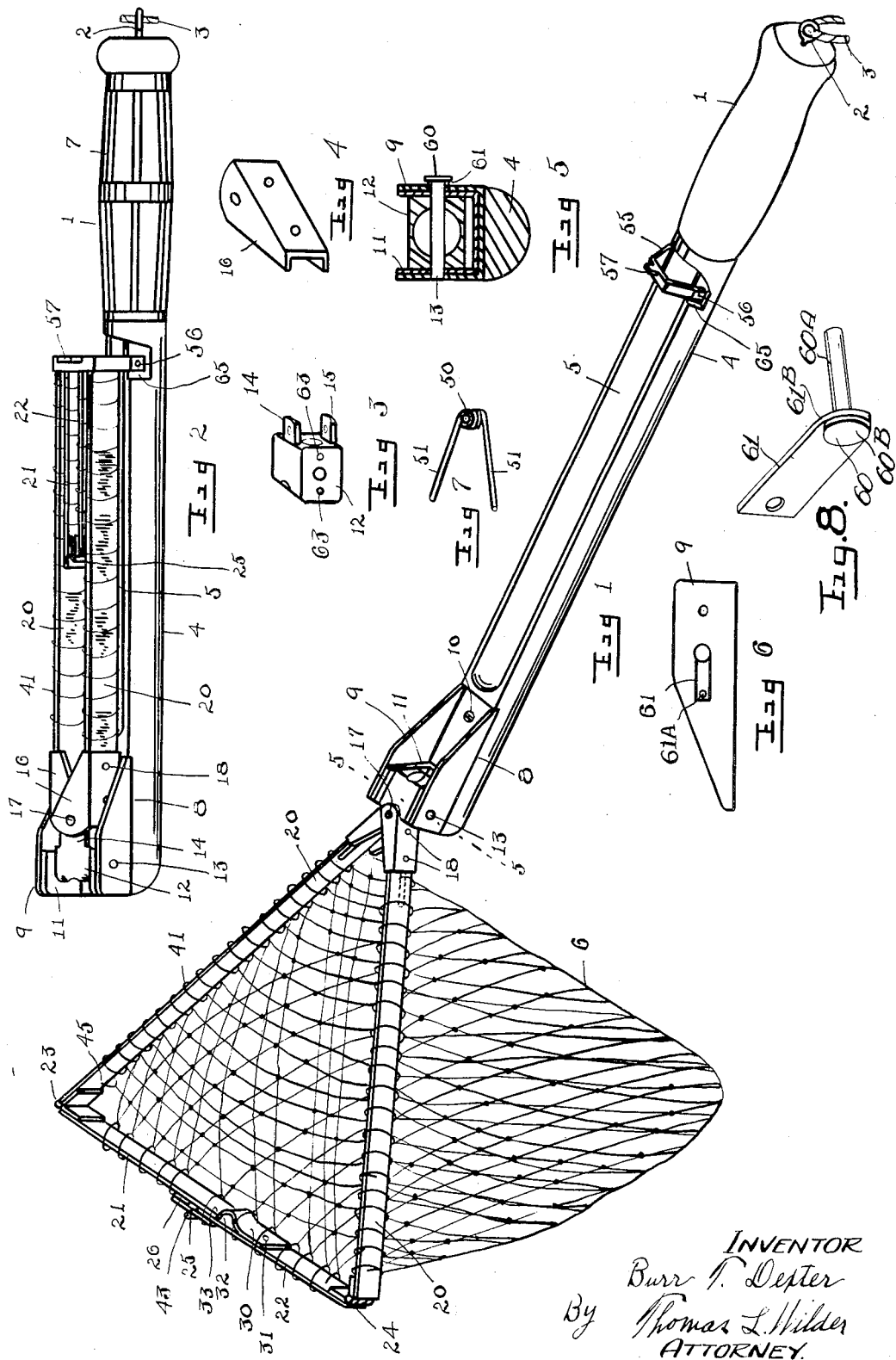
INVENTOR
Burr T. Dexter
By Thomas L. Wilder
ATTORNEY.

Patented May 8, 1934

1,957,944

UNITED STATES PATENT OFFICE 1,957,944

LANDING NET

Burr T. Dexter, Middleville, N. Y.

Application October 12, 1932, Serial No. 637,397

3 Claims. (Cl. 43—12)

My invention relates to a landing net and I declare the following to be a full, clear, concise and exact description thereof sufficient to enable anyone skilled in the art to which it appertains to make and use the same, reference being had to the accompanying drawing in which like reference characters refer to like parts throughout.

The object of the invention is to provide a landing net that can be collapsed into a small space for packing purposes and for portability. Moreover it is designed to be quickly opened by the use of one hand for use in landing a fish caught on a hook by the aid of line and rod, while operating said rod with the other hand.

It is especially desirable to have a landing net that can be collapsed into a small space for carrying the same through the woods and underbrush when on fishing expeditions for under such circumstances the fisherman experiences considerable difficulty in getting the landing net caught on branches of trees and in the thickets.

The above objects will be understood by referring to the drawing in which:

Fig. 1 is a perspective view of the landing net.

Fig. 2 is a top view of the landing net showing the same in knock down or collapsed position.

Fig. 3 is a detail enlarged view showing a perspective of a rock member employed.

Fig. 4 is a detail enlarged view showing a perspective of a channel or sleeve member employed.

Fig. 5 is a transverse section taken on the line 5—5 of Fig. 1, somewhat enlarged.

Fig. 6 is a detail enlarged view showing a side elevation of a channel member employed.

Fig. 7 is a detailed view showing a perspective of the spring employed.

Fig. 8 is a detail enlarged view showing a perspective of a locking member and its co-operating spring employed.

Referring more particularly to the drawing, the device embodies a handle 1, having an eye screw 2 attached to which a shoulder strap 3 can be fastened for convenience of carrying the device. Handle 1 is made of wood, preferably, and formed integral with tubular member 4. Tubular member 4 is recessed or hollowed out on its top surface at 5 to form a chamber for partially housing fishing net 6 hereinafter mentioned. The end is covered with a rubber grip 7, provided with elevated portions to prevent slipping within the hand.

The outer or free end of tubular member 4 is reduced in thickness at 8. Metallic channel member 9 is mounted in a permanent manner to the reduced part 8 of tubular member 4 by screws 10.

A reinforcing channel member 11 is disposed within the first mentioned channel member 9 to aid in lending strength thereto. A hollow rock member 12 substantially square in shape is mounted on a pivot 13 within channel member 11. Pivot 13 is carried in bearings formed by making aligned apertures in the lateral walls of channel members 9 and 11; sufficient space being allowed between the lower surface of rock member 12 and the upper surface of channel member 9 to allow for turning rock member 12.

Rock member 12 has upper and lower projecting portions 14 and 15 which form supports for mounting the cooperating channel shaped metallic sleeves or clips 16, 16. A pivot 17 is projected through the apertures made in projecting portions 14 and 15 and extends through aligned apertures made in sleeves 16, 16, whereby to allow said channel shaped sleeves 16, 16 to turn thereon.

Each of the sleeves 16, 16 has attached by rivets 18 or otherwise supporting arms 20, 20 which form part of the netting frame now to be described. Said arms 20 are in each instance preferably made of some light thin spring metal to reduce weight and allow for the predetermined amount of yield.

The other features of the netting frame comprise auxiliary arm 21 and auxiliary arm 22. Auxiliary arm 21 is hinged at 23 to one of the arms 20, the other auxiliary arm 22 is hinged at 24 to the other arm 20. Auxiliary arm 22 overlaps auxiliary arm 21. The free end of said auxiliary arms 21 and 22 are hinged together at 25. A compensating block 26 to allow for thickness is attached to auxiliary arm 22 in connection with the mounting of hinge 25. A spring locking clip 30 is attached by rivet 31 or otherwise to auxiliary arm 22. Its free end 32 is adapted to engage the free end edge 33 of auxiliary arm 21, whereby to hold said auxiliary arms 22 and 21 temporarily in aligned position as shown particularly in Fig. 1. Hinge 25 will allow auxiliary arms 22 and 21 to swing inward but not outward beyond the aligned position illustrated in Fig. 1.

The net 6 having loops 41 is threaded on auxiliary arms 21, 22 and arms 20, 20, whereby to hold net 6 in proper relation to its frame. In threading loops 41 on to auxiliary arms 21 and 22 and arms 20, 20, it will be found convenient to remove pintle 43 of hinge 25, whereby auxiliary arms 21 and 22 can be freed from each other and moved into a position that will be in prolongation of arms 20, 20.

Certain of the loops 41 are fastened at given points 45, 45, 45, 45, whereby to hold the several loops 41 in correct position along auxiliary arms 21, 22 and arms 20, 20. For this purpose small apertures are made in arms 20, 20 at said locations 45, to allow for threading the strands of the loops 41 therethrough and tie the same.

The means for holding arms 20, 20 at an angle to each other as shown in Fig. 1 embodies a spring wire 50 which is coiled about pivot 17. Its free ends 51, 51 are extended along to lie adjacent the inner sides of each of the arms 20, 20. The tension of spring 50 will cause arms 20, 20 to automatically spring outward into position illustrated in Fig. 1. The force of said spring will be sufficient also to cause the free end 33 of auxiliary arm 21 to snap past the free end 32 of spring lock 30.

The netting frame hereinabove described can be collapsed by pushing inward on hinge 25, whereby to cause auxiliary arms 21 and 22 to move inward and then pushing arms 20, 20 towards each other, whereby said auxiliary arms 21 and 22 and arms 20, 20, will lie in parallel planes to each other as shown particularly in Fig. 2. This actuation of the netting frame to collapsed position can be affected by one hand while holding the grip 7 in the other. When thus collapsed the netting frame as a whole can be swung upon pivot 13 as an axis and in the position illustrated in Fig. 2, whereby the netting frame and handle 1 will be doubled back upon each other and lie in parallel planes as illustrated in Fig. 2.

The means for locking the netting frame in closed or collapsed position as shown in Fig. 2. embodies a rock yoke 55 which is pivoted to handle 1 at 56, 56. Rock yoke 55 has an upstanding thumb portion 57 to aid in turning the same to released or closed position.

There is also a spring pressed locking member 60 which is mounted in suitable aligned apertures in channel members 9 and 11. It is held in position by a flat spring 61 attached by a rivet 61—A or otherwise to channel member 9. The free end 61—B of spring 61 has an aperture for the projection of shaft 60—A of locking member 60. The inner surface of head 60—B of member 60 is welded or otherwise fastened to the free end 61—B of spring 61. The inner end of spring pressed locking member 60 engages apertures 63, 63 in rock member 12, whereby to automatically hold the netting frame in either open or closed position. It can be released by pulling outward on spring pressed locking member 60 against the tension of spring 61.

In operation the user will clasp grip 7 with his hand and by exerting a slight pressure rearward with his thumb on upstanding member 57 of the yoke 55 will release the free ends of the netting frame whereupon he will give a slight downward impulse to the handle 1 as a whole. The netting frame will rock outward on pivot 13 to a prolonged position with handle 1. At the same time spring 50 will exert a pressure on each of the arms 20, 20 and cause them to assume the angular position as illustrated in Fig. 1. This movement of arms 20, 20 will cause also auxiliary arms 22 and 23 to move into position illustrated in Fig. 1. The free end 33 of auxiliary arm 22 snapping past the free end 32 of spring 30, and be thereby temporarily locked in open position of the net.

The net will then be in position to use as a landing net.

It will be observed that this operation of expanding the net can be accomplished with one hand, leaving the other hand free to manipulate the fishing pole not shown.

Handle member 1 is recessed at 65 on opposite sides to limit the rocking motion of yoke 55.

Projecting portions 14 and 15 of rock member 12 are slightly concaved on their near surfaces to aid in holding spring 50 in position.

Having thus described my invention what I claim as new and desire to secure by Letters Patent is as follows:

1. In a landing net, a jointed folding frame for holding a fishing net, a rocking member for holding said frame in predetermined positon, a handle to which said frame is pivotally attached, automatic spring means for expanding said first named frame, a spring pressed locking member for holding said first named frame in open position, and a rock member for locking said jointed frame in relation to said handle.

2. In a landing net, a folding frame comprising supporting arms and auxiliary arms pivoted to each other, means for collapsing said frame by allowing said auxiliary arms to move in between said supporting arms, a handle to which said frame is pivotally attached, whereby said frame can move into parallel relation with said handle and spring means for expanding said folding frame.

3. In a landing net, a jointed folding frame for holding a fishing net, a rocking member for holding said frame in predetermined position, a handle to which said frame is pivotally attached, automatic spring means for expanding said first named frame, and a spring pressed locking member for holding said first named frame in open position.

BURR T. DEXTER.